A. B. LIPSEY.
NUT LOCK.

No. 278,248.  Patented May 22, 1883.

Witnesses:
James H. Hunter.
H. Newell

Inventor:
Andrew B. Lipsey

United States Patent Office.

ANDREW B. LIPSEY, OF HOBOKEN, NEW JERSEY.

NUT-LOCK.

SPECIFICATION forming part of Letters Patent No. 278,248, dated May 22, 1883.

Application filed February 25, 1880.

*To all whom it may concern:*

Be it known that I, ANDREW B. LIPSEY, of Hoboken, in the State of New Jersey, have invented certain new and useful Improvements in Nut-Locks, whereof the following is a specification.

This invention relates to a simple construction of the nut so that it may be readily and conveniently locked into the screw-bolt when the nut is in any position or location, and in certain cases—for instance, where small or light nuts are employed—with only the pressure of any small or convenient tool.

Figure 1:
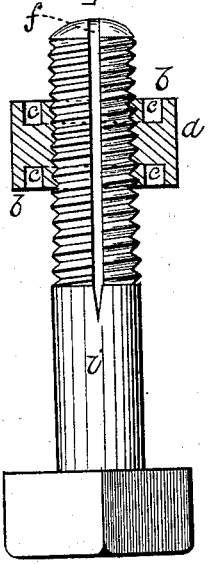
Figure 2:
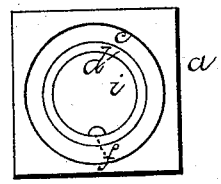

In the drawings, Figure 1 is a view of the bolt with a vertical central section of the nut contained thereon. Fig. 2 is a plan or end view of the nut alone.

*a* is a nut. In the surface of either or both ends *b b*, made either by reaming out or swaging during the manufacture of the nut or after it is manufactured, is a narrow circular groove or channel, *c*, thereby leaving a collar or boss, *d*, in the end and close to the circular opening of the nut. The collar or boss is contained wholly within the body of the nut *a* itself.

*e* is the screw-bolt.

*f* is a small groove cut longitudinally into the thread of this bolt after it is made; or this groove may be rolled into it during the process of its manufacture. I prefer this groove to be curved in form, although it will answer well if made V-shaped.

The advantages of this nut-lock are as follows: It can be fastened to the screw-thread of the bolt by the aid of any small sharp instrument inserted into the channel surrounding the collar, as the wall of the channel opposite to the boss will serve as a *point-d'appui* or support for the instrument while it is forcing the collar down into the groove of the screw-bolt. The longitudinal groove in the bolt may be dispensed with altogether, as the pressure down onto the threads of the bolt will indent the threads enough to cause a sufficient locking of the parts together. With the nut so constructed, the locking of the parts together can be performed no matter where the nut or bolt is located in a machine or on a rail. The bolt is often in such a location on a machine or rail that a hammer cannot conveniently reach the nut on it, and another instrument must then of necessity be used. Again, the locking can be performed on either surfaces or ends of the nut, so that either the rounded end or sharp end of the nut can be turned toward the end of the bolt and locked. Also, the locking device is within the body of the nut, not increasing its size by reason of its addition. The nuts now in use can be altered over to contain this arrangement without reheating, and simply by cutting out a channel in the end of the nut.

I am aware that a nut has been heretofore made with a projecting collar capable of being used either with a bolt of the ordinary kind or a bolt containing in it a longitudinal groove, and I hereby disclaim such.

I claim—

1. A nut containing in one or both of its ends an annular channel giving rise to a thin collar immediately surrounding the bolt-hole, substantially as described.

2. A nut containing in one or both of its ends an annular channel giving rise to a thin collar immediately surrounding the bolt-hole jointly with a bolt provided with longitudinal grooves, into which said collar may be forced and the nut thus fastened to the bolt, substantially as and for the purpose described.

ANDREW B. LIPSEY.

Witnesses:
JAMES H. HUNTER,
CHARLES A. SEELEY.